United States Patent
Coe et al.

(10) Patent No.: US 12,557,154 B2
(45) Date of Patent: Feb. 17, 2026

(54) PASSENGER IDENTIFIER SEAT ACCESS

(71) Applicant: FORD GLOBAL TECHNOLOGIES, LLC, Dearborn, MI (US)

(72) Inventors: Stephen Coe, Ariss (CA); Joseph Wisniewski, Royal Oak, MI (US); Jennifer Ariane Shepherd Moore, Northville, MI (US); Pavankumar Surabathula, Northville, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 1323 days.

(21) Appl. No.: 17/023,067

(22) Filed: Sep. 16, 2020

(65) Prior Publication Data
US 2022/0086929 A1    Mar. 17, 2022

(51) Int. Cl.
*H04W 76/14* (2018.01)
*H04W 76/19* (2018.01)

(52) U.S. Cl.
CPC ............ *H04W 76/14* (2018.02); *H04W 76/19* (2018.02)

(58) Field of Classification Search
CPC .................................................. H04W 76/14
USPC ....................................................... 370/310
See application file for complete search history.

(56) References Cited

U.S. PATENT DOCUMENTS

| | | | |
|---|---|---|---|
| 2009/0122795 A1* | 5/2009 | H-P Nurmi | H04L 12/18 370/389 |
| 2009/0298428 A1 | 12/2009 | Shin | |
| 2014/0210635 A1* | 7/2014 | Majava | H04B 7/084 342/377 |
| 2016/0150350 A1* | 5/2016 | Ingale | H04W 4/38 370/255 |
| 2017/0361792 A1* | 12/2017 | Lem | E05B 81/74 |
| 2018/0131671 A1 | 5/2018 | Thaler et al. | |
| 2018/0132298 A1* | 5/2018 | Birnam | H04B 11/00 |
| 2019/0075611 A1 | 3/2019 | Rabii et al. | |
| 2019/0082378 A1 | 3/2019 | Dziurda | |
| 2019/0098478 A1 | 3/2019 | Rabii et al. | |

FOREIGN PATENT DOCUMENTS

CN        102149167 A     8/2011

OTHER PUBLICATIONS

Indian Patent App. No. 201741030697 published Mar. 1, 2019.

* cited by examiner

*Primary Examiner* — Faruk Hamza
*Assistant Examiner* — Jean F Voltaire
(74) *Attorney, Agent, or Firm* — Joseph Zane; BROOKS KUSHMAN P.C.

(57) ABSTRACT

Responsive to detection of a personal device, a closest one of a plurality of HMIs to the personal device is identified. Responsive to an address store including a hardware address of the personal device, the configurable hardware address of the closest one of the plurality of HMIs is updated to be a HMI hardware address mapped to the personal device hardware address. The personal device is then able to reconnect to the closest one of the plurality of HMIs.

18 Claims, 7 Drawing Sheets

PASSENGER IDENTIFIER SEAT ACCESS

TECHNICAL FIELD

Aspects of the disclosure relate to pairing and saving passenger identifiers for in-vehicle wireless devices, which aids in service provisioning when a passenger re-enters a vehicle in a different seating location.

BACKGROUND

Certain wireless devices, such as BLUETOOTH devices, must be paired with one another before they can establish a connection. This pairing process involves setting the devices into a discovery mode in which the devices broadcast identifying information. The pairing process may require user confirmation, such as entering a code displayed by one device into the other device. Once paired, the devices may use an access key to automatically connect to one another.

SUMMARY

In one or more illustrative examples, a system for dynamic reconnection of personal devices is provided. The system includes a plurality of human machine interfaces (HMIs), each of the HMIs located in a different seating zone and having a configurable hardware address. The system further includes an address store configured to maintain device pairing information for the plurality of HMIs, the information mapping personal device hardware addresses to corresponding HMI hardware addresses. The system further includes a passenger detection system configured to detect proximity of personal devices to each of the plurality of HMIs. The system further includes a processor programmed to responsive to detection of a personal device by the passenger detection system, identify a closest one of the plurality of HMIs to the personal device, responsive to the address store including a hardware address of the personal device, update the configurable hardware address of the closest one of the plurality of HMIs to a HMI hardware address mapped to the personal device hardware address, and reconnect the personal device to the closest one of the plurality of HMIs In one or more illustrative examples, a method for dynamic reconnection of personal devices is provided. The method includes responsive to detection of a personal device, identifying a closest one of a plurality of HMIs to the personal device; responsive to an address store including a hardware address of the personal device, updating the configurable hardware address of the closest one of the plurality of HMIs to a HMI hardware address mapped to the personal device hardware address; and reconnecting the personal device to the closest one of the plurality of HMIs In one or more illustrative examples, a non-transitory computer-readable medium is provided comprising instructions that, when executed by a processor of a computing device, cause the computing device to perform operations including responsive to detection of a personal device, identify a closest one of a plurality of HMIs to the personal device; responsive to an address store including a hardware address of the personal device, update the configurable hardware address of the closest one of the plurality of HMIs to a HMI hardware address mapped to the personal device hardware address; and reconnect the personal device to the closest one of the plurality of HMIs.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

A user may pair his or her phone or other portable device to other devices. When pairing, each device registers a unique identifier with each other device. The device's media access control (MAC) address is typically the identifier that is used for such pairing. Each device then broadcasts its unique MAC address when attempting to reconnect to the paired device. Over time, a long list of available devices may become available for the user's phone to pair with. When pairing devices, the user may see all of the in-vehicle devices and all of the other devices in a long list. These devices to pair with often have similar or indistinct names. This may become difficult to navigate on a hand-held device.

In the vehicle environment, the quantity of in-vehicle resources that the user can pair with is increasing. For instance, a vehicle may provide for multiple BLUETOOTH connections to the vehicle infotainment system. Moreover, some vehicles now are equipped with individual seat zones that allow users to control in-seat speakers, climate, and video entertainment within the user's specific zone.

Depending on the user's device settings, BLUETOOTH resource device settings, and prioritization mechanisms, users may experience conflicting pairing modes where a resource will disconnect or reconnect during a streaming session. Depending where a user sits for each excursion in the vehicle, the user may be required to pair his or her device each time. These aspects may add to user confusion and frustration when attempting to pair or reconnect the user's device to the vehicle.

By taking advantage of dynamic hardware addressing, an approach is provided for dynamic reconnection of personal devices. Responsive to detection of a personal device, a closest one of a plurality of HMIs to the personal device is identified. Responsive to an address store including a hardware address of the personal device, the configurable hardware address of the closest one of the plurality of HMIs is updated to be an HMI hardware address mapped to the personal device hardware address. The personal device is then able to reconnect to the closest one of the plurality of HMIs. It should be noted that while many examples herein relate to HMI in the user's zone, the described approaches relate to any zone-specific functionality, regardless of whether an HMI is provided. For instance, similar aspects may be utilized with respect to pairing with NFC tags at the various seating locations, and/or with pairing to a specific seat before entering the vehicle, without any HMI interaction with the vehicle. Further aspects of the disclosure are discussed in detail herein.

Figure 1:
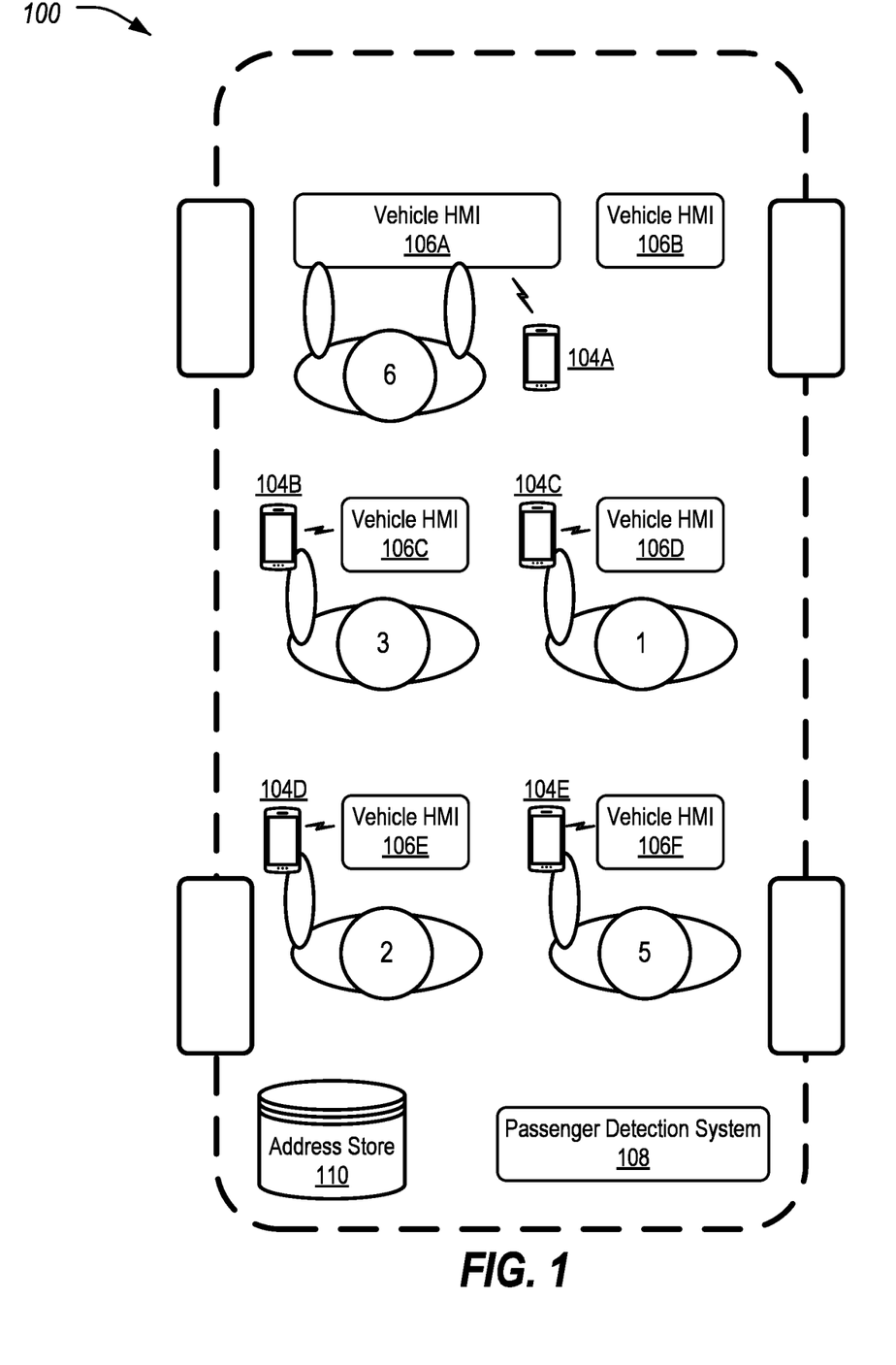
FIG. 1 illustrates an example system including a vehicle with a plurality of in-vehicle devices configured to locate and interact with users and personal devices of the users.

FIG. 1 illustrates an example system 100 including a vehicle 102 with a plurality of vehicle HMIs 106 configured to locate and interact with users and personal devices 104 of the users. The system 100 may be configured to allow the users, such as vehicle occupants, to seamlessly interact with the vehicle HMIs 106 in the vehicle 102. Moreover, the interaction may be performed without requiring the personal devices 104 to pair for each different seating location of the vehicle 102.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The personal devices 104A, 104B, 104C, 104D, 104E (collectively personal devices 104) may include mobile devices of the users, and/or wearable devices of the users. The mobile devices may be any of various types of portable computing device, such as cellular phones, tablet computers, smart watches, laptop computers, portable music players, or other devices capable of networked communication with other mobile devices. The wearable devices may include, as some non-limiting examples, smartwatches, smart glasses, fitness bands, control rings, or other personal mobility or accessory device designed to be worn and to communicate with the user's mobile device.

The vehicle HMI 106A through 106F (collectively vehicle HMI 106) may include various elements of the vehicle 102 supporting user interaction with the users and/or with the user's personal devices 104. As used herein, HMI is intended to encompass human-to-machine interfaces as well as machine-to-machine interfaces guided by human intention (i.e., not necessarily being limited to direct human input to a device). These vehicle HMI 106 elements may support functions such as overhead lighting, climate control, seat control, audio reproduction, video entertainment, or automated window shades. In many cases, the vehicle HMI 106 may expose controls such as buttons, sliders, and touch-screens that may be used by the user to configure the particular settings of the vehicle HMI 106. As some possibilities, the controls of the vehicle HMI 106 may allow the user to set a lighting level of a light control, set a temperature of a climate control, set a volume and source of audio for a speaker, and set a position of a seat.

The vehicle 102 interior may be divided into multiple zones according to the vehicle HMI 106, where each zone may be associated with a seating position within the vehicle 102 interior. For instance, a front row of the illustrated vehicle 102 may include a vehicle HMI 106A associated with the driver seating position, and a vehicle HMI 106B associated with a front passenger seating position. A second row of the illustrated vehicle 102 may include a vehicle HMI 106C associated with a driver-side second-row seating position and a vehicle HMI 106D associated with a passenger-side second-row seating position. A third row of the illustrated vehicle 102 may include a vehicle HMI 106E associated with a driver-side third-row seating position and a vehicle HMI 106F associated with a passenger-side third-row seating position. Variations on the number and arrangement of zones are possible. For instance, an alternate second row may include an additional vehicle HMI 106 for a second-row middle seating position (not shown).

Each user would like to connect their respective personal device 104 to their own vehicle HMI 106. This allows the users to take advantage of the vehicle HMI 106 elements that correspond to the user's current location. Five occupants are illustrated as being inside the example vehicle 102, each of whom has a corresponding personal device 104. A driver occupant (user 6) has a personal device 104A paired with the vehicle HMI 106A. A second-row passenger occupant (user 3) has a personal device 104B paired with the vehicle HMI 106C. A second-row passenger occupant (user 1) has a personal device 104C paired with the vehicle HMI 106D. A third-row passenger occupant (user 2) has a personal device 104D paired with the vehicle HMI 106E. A third-row passenger occupant (user 5) has a personal device 104E paired with the vehicle HMI 106F.

The passenger detection system 108 may be configured to detect the locations of the personal devices 104 within the vehicle 102. The passenger detection system 108 may use one or more device location-tracking techniques to identify the zone in which the personal device 104 is located. In an example, the distance of the target from a reference can be obtained from a measurement of signal strength of the personal device 104 to the vehicle HMI 106. For example, RSSI signal strength information available in the Bluetooth Low-Energy (BLE) protocol may be used to infer the distance of a personal device 104 from each of the vehicle HMI 106 interfaces. The passenger detection system 108 may additionally or alternately make use of other location detection techniques. As some examples, user biometrics may be measured and/or vision recognition systems may be used to aid in the identification of the location of the user and therefore of the personal device 104.

The address store 110 may be configured to store pairing information for the personal devices 104 to the vehicle 102. When pairing, each personal device 104 registers a unique identifier with the vehicle HMI 106 that it is paired with. The device's media access control (MAC) address is typically the identifier that is used for such pairing. Each personal device 104 then broadcasts its unique MAC address when attempting to reconnect to the vehicle HMI 106.

Figure 2:
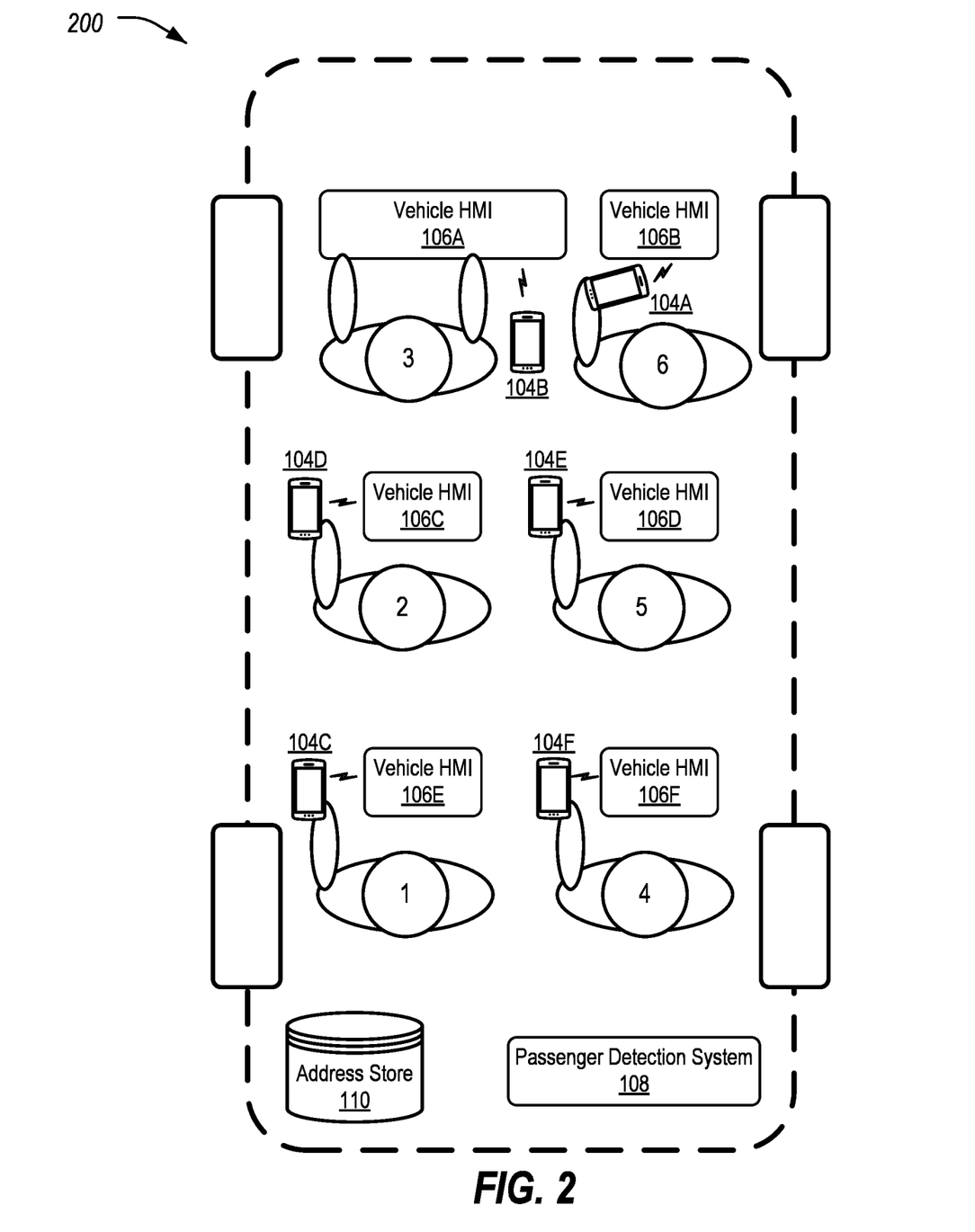
FIG. 2 illustrates an example layout in which the vehicle users are in different locations as compared to FIG. 1.

In many cases, it is likely that the users may not sit in the same seat every time the vehicle 102 is used. FIG. 2 illustrates an example layout 200 in which the vehicle 102 users are in different locations as compared to FIG. 1. As shown in the example of FIG. 2, the personal device 104A is paired to the vehicle HMI 106B, the personal device 104B is paired to the vehicle HMI 106A, the personal device 104C is paired to the vehicle HMI 106E, the personal device 104D is paired to the vehicle HMI 106C, the personal device 104E is paired to the vehicle HMI 106D, and the personal device 104F is paired to the vehicle HMI 106F. Thus, the user 3 is now the driver, the user 3 is now in the vehicle, and users 1, 2, 4, 5 are sitting in different locations.

Figure 3:
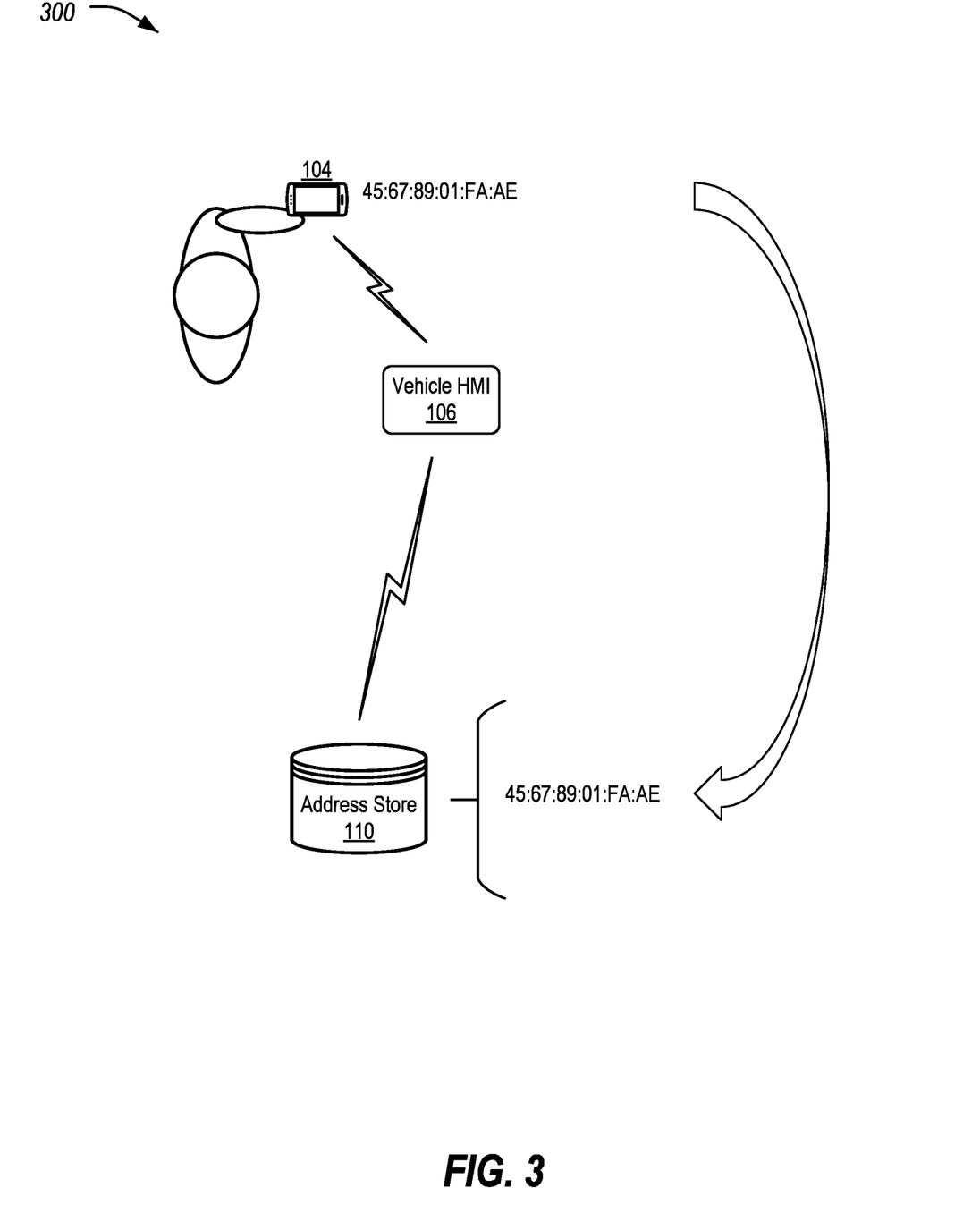
FIG. 3 illustrates an example of a pairing of a personal device with a vehicle HMI.

FIG. 3 illustrates an example 300 of a pairing of a personal device 104 with a vehicle HMI 106. In this example situation, a user enters the vehicle 102 for the first time. The passenger detection system 108 of the vehicle 102 may detect the personal device 104. The user may then interact with the vehicle HMI 106 to confirm the pairing of the new personal device 104 with the vehicle 102. For example, the vehicle HMI 106 may display or otherwise provide a list of all personal devices 104 detected by the passenger detection system 108. In some examples, this list may be sorted by proximity, such that the closest personal device 104 to the vehicle HMI 106 is listed first. The user may confirm the pairing of the personal device 104 using the vehicle HMI 106 (and/or the HMI of the user's personal device 104).

Once paired, the address of the personal device 104 is registered and saved to the address store 110. Similarly, the personal device 104 stores a corresponding address of the specific vehicle HMI 106 that was connected to. Thus, when these addresses are again seen and recognized, the personal device 104 may automatically reconnect to the vehicle HMI 106. In some examples, additional information regarding user biometrics is captured. This additional information may be used to further aid in identifying a returning user.

Figure 4:
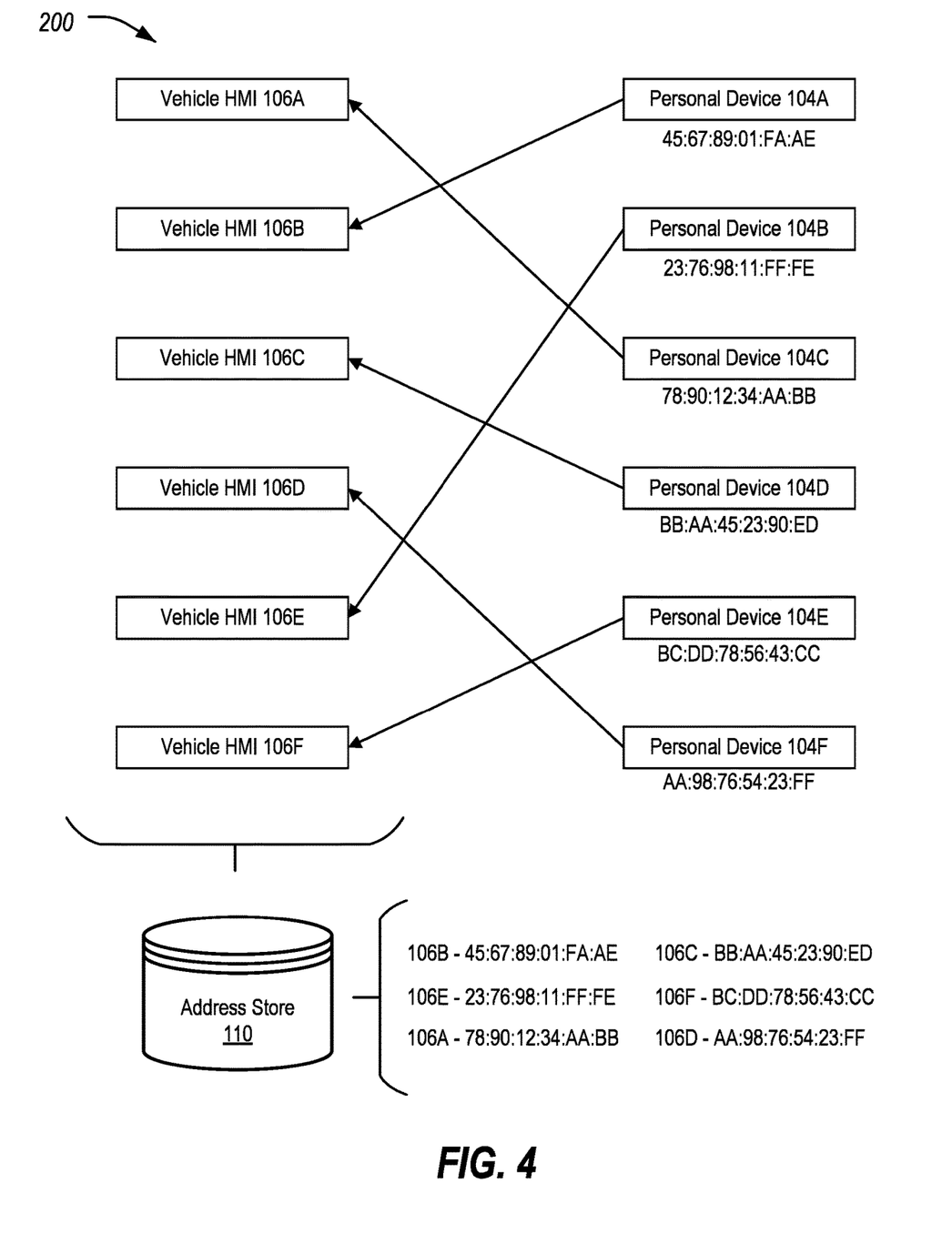
FIG. 4 illustrates an example of pairing information stored to the address store. As shown, the address store stores pairing information for personal devices paired to any of the vehicle HMIs.

FIG. 4 illustrates an example of pairing information stored to the address store 110. As shown, the address store 110 stores pairing information for personal devices 104 paired to any of the vehicle HMIs 106. As shown in the example, the personal device 104A is paired to the vehicle HMI 106B, the personal device 104B is paired to the vehicle HMI 106E, the personal device 104C is paired to the vehicle HMI 106A, the personal device 104D is paired to the vehicle HMI 106C, the personal device 104E is paired to the vehicle HMI 106F, and the personal device 104F is paired to the vehicle HMI 106D. The address information for the vehicle HMIs 106 is all stored in the address store 110. Thus, the address store 110 acts as a common store for personal devices 104 that have been paired to any of the vehicle HMIs 106.

Additionally, as the personal devices 104 are paired to a specific identifier of the particular vehicle HMI 106A, an indication of the vehicle HMI 106 that the personal device 104 is paired with and/or an address vehicle HMI 106 that the personal device 104 is paired with may also be stored to the address store 110. This allows the vehicle 102 to be aware of which address of the vehicle 102 that the personal device 104 is paired with.

Figure 5:
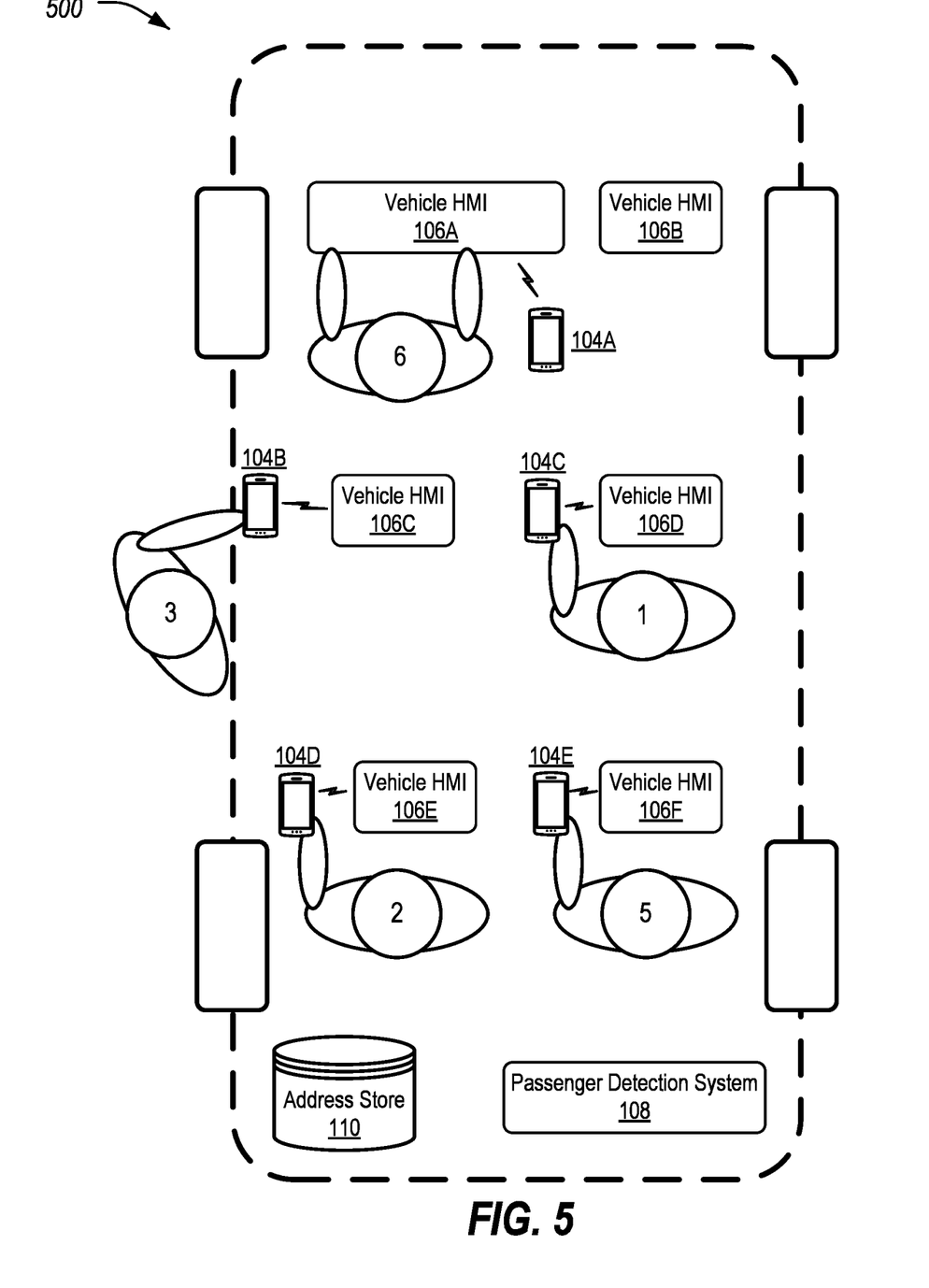
FIG. 5 illustrates an example of passenger detection within the vehicle.

FIG. 5 illustrates an example 500 of passenger detection within the vehicle 102. When the passenger detection system 108 of the vehicle 102 detects the presence of one of the addresses of the personal devices 104, the passenger detection system 108 may use location detection techniques (such as signal strength and/or approach angle, user input, stored biometrics, etc.) to make an identification of the vehicle HMI 106 that is located closest to the personal device 104. This may be used to infer the location of the user corresponding to the personal device 104. In some examples, the users may confirm the correct vehicle HMI 106 location using a button or other control of the vehicle HMI 106.

While the users may be at different vehicle HMI 106 locations when returning to the vehicle 102, from the user perspective it inconvenient to be required to re-pair the personal device 104 each time the personal device 104 is connected to a different vehicle HMI 106 location. A range of MAC addresses may be defined that is specific to vehicle 102 use, and programming the vehicle 102 to recognize user seating behavior patterns based on detected seat locations in the vehicle 102, the personal device 104 may be automatically paired to any of the vehicle HMI 106 locations after a first manual pairing of the personal device 104 is done to any of the vehicle HMI 106 locations in the vehicle 102.

Responsive to the vehicle 102 identifying a personal device 104 is located at a specific vehicle HMI 106, the identified vehicle HMI 106 may be reassigned to the vehicle address that the personal device 104 saw when originally pairing to the vehicle 102. Thus, even if the personal device 104 returns to a different vehicle HMI 106 location in the vehicle 102, from the perspective of the personal device 104 the personal device 104 is returning to the same vehicle HMI 106 with which the personal device 104 is already paired.

Figure 6:
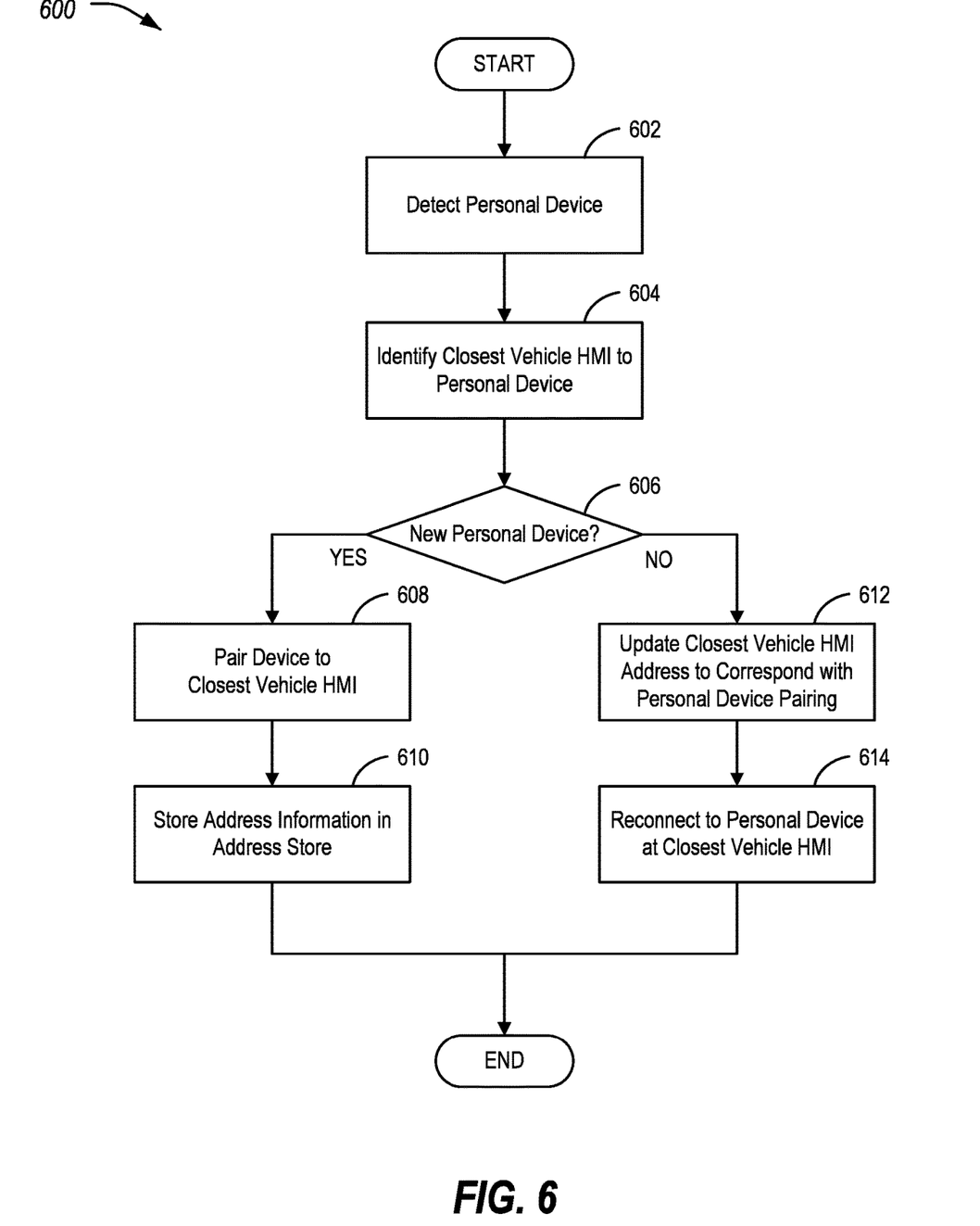
FIG. 6 illustrates an example process for the connection of personal devices to vehicle HMI.

FIG. 6 illustrates an example process 600 for the connection and reconnection of personal devices 104 to vehicle HMI 106. In an example, the process 600 may be performed by the elements of the system 100. For instance, the process 600 may operate under the direction of one of the vehicle HMI 106 controllers, e.g., the vehicle HMI 106A of the main driver HMI in an example. As some other examples, the process 600 may operate under the direction of a dedicated controller, by the telematics controller of the vehicle 102, or as a function integrated into one or more other controllers of the vehicle 102.

At operation 602, the system 100 detects a personal device 104. In an example, the passenger detection system 108 utilizes one or more device location-tracking techniques to identify proximity of the personal device 104 to the vehicle HMIs 106. In an example, the distance of the personal device 104 from each of the vehicle HMIs 106 can be obtained from a measurement of signal strength of the personal device 104 to the vehicle HMI 106. For instance, RSSI signal strength information available in the Bluetooth Low-Energy (BLE) protocol may be used to infer the distance of a personal device 104 from each of the vehicle HMI 106 interfaces. The passenger detection system 108 may additionally or alternately make use of other location detection techniques. As some examples, user biometrics may be measured and/or vision recognition systems may be used to aid in the identification of the location of the user and therefore of the personal device 104. For instance, if a user of a personal device 104 may be weighed by a seat sensor when initially pairing the personal device 104, and if this weight is detected again by a seat then it can be inferred that the same user has returned.

At operation 604, the system 100 identifies a closest vehicle HMI 106 to the personal device 104. In an example, the distances of the personal device 104 to each of the vehicle HMIs 106 may be sorted by the proximity determined at operation 602, such that the closest personal device 104 to the vehicle HMI 106 is identified as the vehicle HMI 106 with the shortest distance (and/or highest signal strength) to the personal device 104.

At operation 606, the system 100 determines whether the detected personal device 104 is new to the vehicle 102 or has been previously paired to the vehicle 102. In an example, an address of the personal device 104 (e.g., its MAC address) is queried for in the address store 110. If the address is not found in the address store 110, control passes to operation 608 to pair the personal device 104 for the first time. If the address is found, control passes to operation 612 to reconnect the personal device 104.

At operation 608, the system 100 pairs the personal device 104 to the closest vehicle HMI 106. In an example, the user interacts with the vehicle HMI 106 to confirm the pairing of the new personal device 104 with the vehicle 102. For instance, the vehicle HMI 106 may display or otherwise provide a list of all personal devices 104 detected by the passenger detection system 108, and the user may confirm the pairing of the personal device 104 using the vehicle HMI 106 (and/or the HMI of the user's personal device 104).

At operation 610, the system 100 stores address information for the personal device 104 to the address store 110. For instance, the MAC address of the personal device 104 may be saved to the address store 110 shared by the vehicle HMIs 106. Similarly, the personal device 104 stores a corresponding address of the specific vehicle HMI 106 that was connected to. This allows that when these addresses are again seen and recognized, the personal device 104 may automatically reconnect to the vehicle HMI 106. In some examples, additional information regarding user biometrics is captured. This additional information may also be stored to the address store 110 and used to further aid in identifying a returning user.

At operation 612, the system 100 updates the closest vehicle HMI 106 to have an address to correspond with the pairing of the personal device 104 to the vehicle 102. In an example, the address store 110 is accessed to retrieve information indicative of what address of the vehicle 102 (e.g., MAC address) was given to the personal device 104 when the personal device 104 was previously paired to the vehicle 102. The closest vehicle HMI 106 may accordingly be reassigned to this vehicle address that the personal device 104 saw when originally pairing to the vehicle 102.

At operation 614, the system 100 reconnects to the personal device 104 at the closest vehicle HMI 106. Notably, from the perspective of the personal device 104, the closest vehicle HMI 106 has the same address as the vehicle HMI 106 that the personal device 104 had originally paired with, regardless of whether the current vehicle HMI 106 is actually for the same seating location. This accordingly allows for the user to pair the personal device 104 with the vehicle 102 once but be able to use that single pairing for any vehicle HMI 106 within the vehicle 102. After operation 614, the process 600 ends.

Figure 7:
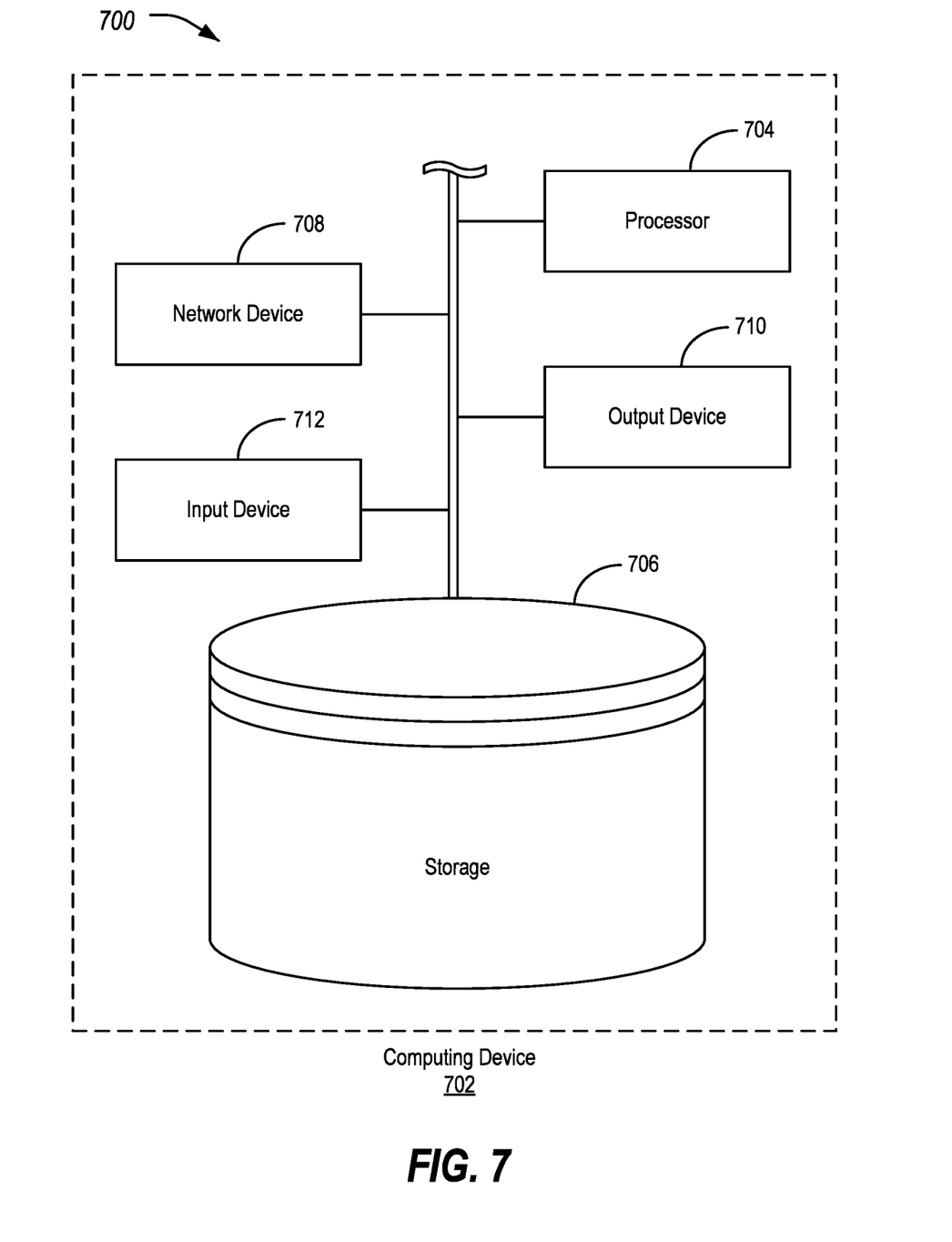
FIG. 7 illustrates an example of a computing device for use in the connection and reconnection of personal devices to the vehicle HMI.

FIG. 7 illustrates an example 700 of a computing device 702 for use in the connection and reconnection of personal devices 104 to vehicle HMI 106. Referring to FIG. 7, and with reference to FIGS. 1-6, the personal devices 104, vehicle HMI 106, passenger detection system 108, and address store 110 may be examples of such computing devices 702. As shown, the computing device 702 may include a processor 704 that is operatively connected to a storage 706, a network device 708, an output device 710, and an input device 712. It should be noted that this is merely an example, and computing devices 702 with more, fewer, or different components may be used.

The processor 704 may include one or more integrated circuits that implement the functionality of a central processing unit (CPU) and/or graphics processing unit (GPU). In some examples, the processors 704 are a system on a chip (SoC) that integrates the functionality of the CPU and GPU. The SoC may optionally include other components such as, for example, the storage 706 and the network device 708 into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families.

Regardless of the specifics, during operation the processor 704 executes stored program instructions that are retrieved from the storage 706. The stored program instructions, accordingly, include software that controls the operation of the processors 704 to perform the operations described herein. The storage 706 may include both non-volatile memory and volatile memory devices. The non-volatile memory includes solid-state memories, such as NAND flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 710. The output device 710 may include a graphical or visual display device, such as an electronic display screen, projector, printer, or any other suitable device that reproduces a graphical display. As another example, the output device 710 may include an audio device, such as a loudspeaker or headphone. As yet a further example, the output device 710 may include a tactile device, such as a mechanically raiseable device that may, in an example, be configured to display braille or another physical output that may be touched to provide information to a user.

The input device 712 may include any of various devices that enable the computing device 702 to receive control input from users. Examples of suitable input devices that receive human interface inputs may include keyboards, mice, trackballs, touchscreens, voice input devices, graphics tablets, and the like.

The network devices 708 may each include any of various devices that enable the personal devices 104, vehicle HMI 106, passenger detection system 108, and address store 110 to send and/or receive data from external devices over networks. Examples of suitable network devices 708 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for dynamic reconnection of personal devices, comprising:
    a plurality of human machine interfaces (HMIs), each of the HMIs being located in a different seating zone and having a configurable hardware address;
    an address store configured to maintain device pairing information for the plurality of HMIs, the information mapping personal device hardware addresses to corresponding HMI hardware addresses;
    a passenger detection system configured to detect proximity of the personal devices to each of the plurality of HMIs; and
    a processor programmed to
        responsive to detection of a personal device by the passenger detection system, identify a closest one of the plurality of HMIs to the personal device,
        responsive to the address store including a hardware address of the personal device, update the configurable hardware address of the closest one of the plurality of HMIs to an HMI hardware address mapped to the hardware address of the personal device, and
        reconnect the personal device to the closest one of the plurality of HMIs.

2. The system of claim 1, wherein the HMI hardware addresses are media access control (MAC) addresses.

3. The system of claim 1, wherein the processor is further programmed to:
    responsive to the address store failing to include a hardware address of the personal device, pair the personal device to the closest one of the plurality of HMIs, and update the address store to include a mapping of a current configurable hardware address of the closest one of the plurality of HMIs to the hardware address of the personal device.

4. The system of claim 3, wherein the processor is further programmed to receive an input from the closest one of the plurality of HMIs to confirm pairing of the personal device to the closest one of the plurality of HMIs.

5. The system of claim 1, wherein each of the plurality of HMIs is a user interface in a different respective seating zone of a vehicle, and the personal device is a smartphone of an occupant of the vehicle.

6. The system of claim 1, wherein the address store is further programmed to maintain biometrics for users corresponding to the personal devices, and the processor is further programmed to confirm the closest one of the plurality of HMIs to the personal device according to a biometric match of a user of the personal device to biometrics in the address store corresponding to the personal device.

7. A method for dynamic reconnection of personal devices, comprising:
    responsive to detection of a personal device, identifying a closest one of a plurality of HMIs to the personal device;
    responsive to an address store including a hardware address of the personal device, updating a configurable hardware address of the closest one of the plurality of HMIs to a HMI hardware address mapped to the hardware address of the personal device; and
    reconnecting the personal device to the closest one of the plurality of HMIs.

8. The method of claim 7, further comprising maintaining, in the address store, device pairing information for the plurality of HMIs, the information mapping personal device hardware addresses to corresponding HMI hardware addresses, wherein the HMI hardware addresses are media access control (MAC) addresses.

9. The method of claim 7, further comprising:
    responsive to the address store failing to include a hardware address of the personal device, pairing the personal device to the closest one of the plurality of HMIs; and
    updating the address store to include a mapping of a current configurable hardware address of the closest one of the plurality of HMIs to the hardware address of the personal device.

10. The method of claim 9, further comprising receiving an input from the closest one of the plurality of HMIs to confirm the pairing of the personal device to the closest one of the plurality of HMIs.

11. The method of claim 7, wherein each of the plurality of HMIs is a user interface in a different respective seating zone of a vehicle, and the personal device is a smartphone of an occupant of the vehicle.

12. The method of claim 7, further comprising:
    maintaining biometrics for users corresponding to the personal devices; and
    confirming the closest one of the plurality of HMIs to the personal device according to a biometric match of a user of the personal device to biometrics in the address store corresponding to the personal device.

13. A non-transitory computer-readable medium comprising instructions that, when executed by a processor of a computing device, cause the computing device to perform operations for dynamic reconnection of personal devices including:
    responsive to detection of a personal device, identify a closest one of a plurality of HMIs to the personal device;
    responsive to an address store including a hardware address of the personal device, update a configurable hardware address of the closest one of the plurality of HMIs to an HMI hardware address mapped to the hardware address of the personal device; and reconnect the personal device to the closest one of the plurality of HMIs.

14. The medium of claim 13, further comprising instructions that, when executed by the processor of the computing device, cause the computing device to maintain, in the address store, device pairing information for the plurality of HMIs, the information mapping personal device hardware addresses to corresponding HMI hardware addresses, wherein the HMI hardware addresses are media access control (MAC) addresses.

15. The medium of claim 13, further comprising instructions that, when executed by the processor of the computing device, cause the computing device to:

responsive to the address store failing to include a hardware address of the personal device, pair the personal device to the closest one of the plurality of HMIs; and update the address store to include a mapping of a current configurable hardware address of the closest one of the plurality of HMIs to the hardware address of the personal device.

16. The medium of claim 15, further comprising instructions that, when executed by the processor of the computing device, cause the computing device to receive an input from the closest one of the plurality of HMIs to confirm pairing of the personal device to the closest one of the plurality of HMIs.

17. The medium of claim 13, wherein each of the plurality of HMIs is a user interface in a different respective seating zone, and the personal device is a smartphone of an occupant.

18. The medium of claim 13, further comprising instructions that, when executed by the processor of the computing device, cause the computing device to:

maintain biometrics for users corresponding to the personal devices; and confirm the closest one of the plurality of HMIs to the personal device according to a biometric match of a user of the personal device to biometrics in the address store corresponding to the personal device.

\* \* \* \* \*